(12) United States Patent
Okita (10) Patent No.: US 9,136,781 B2
(45) Date of Patent: Sep. 15, 2015

(54) SYNCHRONOUS CONTROL UNIT FOR SYNCHRONIZING TWO SHAFTS WITH EACH OTHER

(71) Applicant: FANUC CORPORATION, Minamitsuru-gun, Yamanashi (JP)

(72) Inventor: Tadashi Okita, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/229,291

(22) Filed: Mar. 28, 2014

(65) Prior Publication Data

US 2014/0292251 A1    Oct. 2, 2014

(30) Foreign Application Priority Data

Mar. 28, 2013   (JP) ................. 2013-068570

(51) Int. Cl.
*H02P 1/54*   (2006.01)
*H02P 5/52*   (2006.01)
(Continued)

(52) U.S. Cl.
CPC ............... *H02P 5/526* (2013.01); *B23Q 15/00* (2013.01); *G05B 19/18* (2013.01); *G05B 19/4062* (2013.01); *G05D 3/12* (2013.01); *G05B 2219/33228* (2013.01); *G05B 2219/41195* (2013.01); *G05B 2219/42286* (2013.01); *G05B 2219/42332* (2013.01); *G05B 2219/45214* (2013.01); *G05B 2219/50234* (2013.01)

(58) Field of Classification Search
CPC ........... H02P 5/74; H02P 5/00; B60N 2/0228; B23D 36/0041

USPC ............... 318/49, 50, 59.61, 64, 112, 700, 41
See application file for complete search history.

(56) References Cited

U.S. PATENT DOCUMENTS 5,231,335 A  *  7/1993  Mega et al. ..................... 318/85
5,252,900 A  *  10/1993  Uehara et al. ............. 318/568.11
(Continued)

FOREIGN PATENT DOCUMENTS

CN    101261509 A    9/2008
JP    2001300792 A   10/2001
(Continued)

OTHER PUBLICATIONS

Office Action mailed Sep. 2, 2014, corresponding to Japanese patent application No. 2013-068570.

*Primary Examiner* — Rina Duda
(74) *Attorney, Agent, or Firm* — Lowe Hauptman & Ham, LLP (57) ABSTRACT

In the first synchronous system of the synchronous control unit (1), movement commands of the first motor (23) and the second motor (13) made by the movement command making section (9), which are synchronized with each other, are respectively supplied to the first amplifier (22) and the second amplifier (12) through the first communication path (11) and the second communication path (21). In the second synchronous system switched from the first synchronous system, the first motor (23) is decelerated by a deceleration command made by the deceleration making section (29) and the second motor (13) is decelerated synchronously with the first motor by a movement command made by the position feedback value controlled by the first motor (23) supplied to the second amplifier (12) through the third communication path (31).

6 Claims, 8 Drawing Sheets

(51) Int. Cl.
  *B23Q 15/00* (2006.01)
  *G05B 19/18* (2006.01)
  *G05D 3/12* (2006.01)
  *G05B 19/4062* (2006.01)

(56) References Cited

U.S. PATENT DOCUMENTS

| | | | |
|---|---|---|---|
| 5,267,142 | A | 11/1993 | Kono et al. |
| 5,929,575 | A * | 7/1999 | Hyodo ............... 318/69 |
| 6,046,566 | A | 4/2000 | Sonoda et al. |
| 6,534,944 | B2 * | 3/2003 | Toyozawa et al. ........ 318/625 |
| 6,823,235 | B2 * | 11/2004 | Toyozawa et al. ........ 700/193 |
| 7,183,739 | B2 * | 2/2007 | Iwashita et al. ........ 318/625 |
| 7,348,745 | B2 * | 3/2008 | Okita et al. ........ 318/560 |

FOREIGN PATENT DOCUMENTS

| | | |
|---|---|---|
| JP | 2005117832 A | 4/2005 |
| JP | 3853903 B2 | 12/2006 |
| JP | 3853908 B2 | 12/2006 |
| JP | 2007288925 A | 11/2007 |
| JP | 2012175875 A | 9/2012 |
| WO | 90/12674 A1 | 11/1990 |

* cited by examiner

SYNCHRONOUS CONTROL UNIT FOR SYNCHRONIZING TWO SHAFTS WITH EACH OTHER

RELATED APPLICATIONS

The present application claims priority to Japanese Application Number 2013-068570, filed Mar. 28, 2013, the disclosure of which is hereby incorporated by reference herein in its entirety.

BACKGROUND OF THE INVENTION

1. Field of the Invention

The present invention relates to a synchronous control unit for synchronizing two shafts with each other in a machine tool, for example, a gear finishing machine.

2. Description of the Related Art

A machine tool, for example, a gear finishing machine includes: a tool shaft having a tool; and a workpiece shaft for holding a workpiece. The tool is rotated by a tool shaft motor around the tool shaft and the workpiece is rotated by a workpiece shaft motor around the workpiece shaft. It is necessary for the workpiece shaft and the tool shaft to be driven synchronously with each other.

Figure 6:
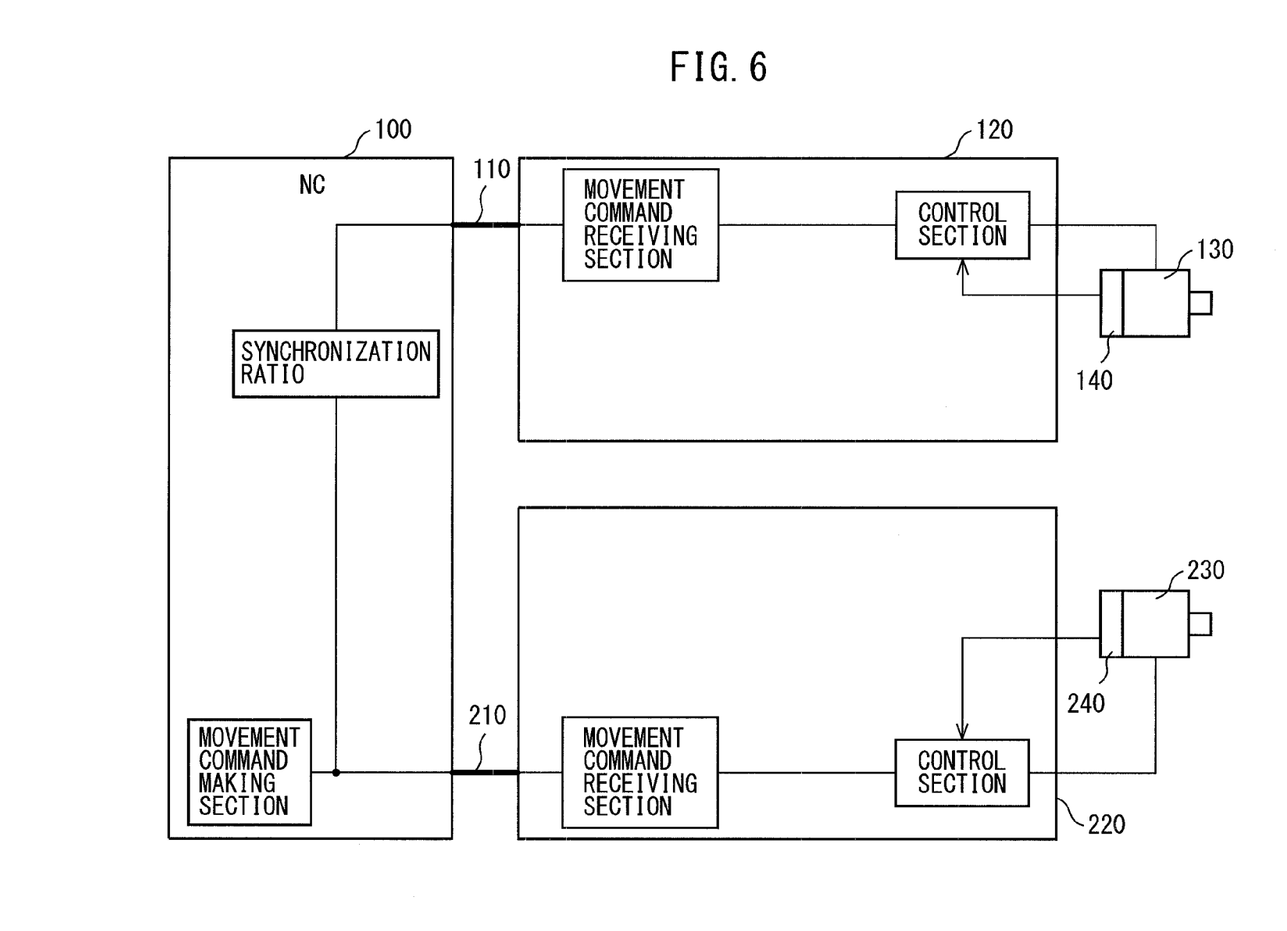
FIG. 6 is a block diagram of a synchronous control unit of the NC command synchronous system.

In order to synchronize the two shafts with each other, the NC command synchronous system and the master-slave synchronous system are provided. FIG. 6 is a block diagram of the synchronous control unit of the NC command synchronous system. In FIG. 6, a movement command made in the control unit 100 is supplied to the tool shaft amplifier 220 through the second communication path 210 and then supplied to the tool shaft motor 230. After the movement command is multiplied by a synchronization ratio, it is supplied to the workpiece shaft amplifier 120 through the first communication path 110 and then supplied to the workpiece shaft motor 130. In other words, in the NC command synchronous system, the movement command for the tool shaft motor and the movement command for the workpiece shaft motor, which are made for synchronous operation, are respectively supplied from the control unit to the tool shaft motor and the workpiece shaft motor.

Figure 7:
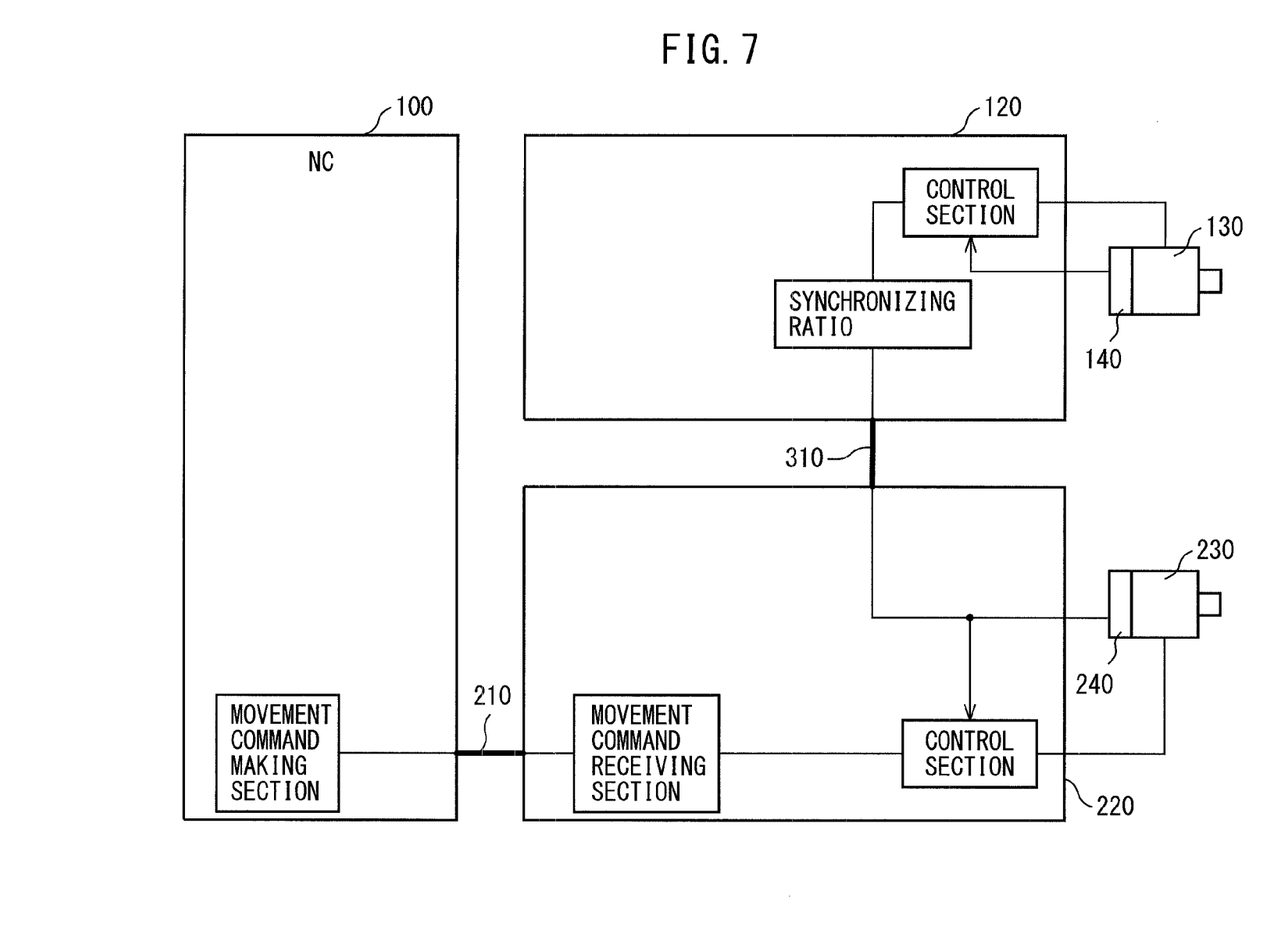
FIG. 7 is a block diagram of a synchronous control system of the master-slave synchronous system.

FIG. 7 is a block diagram of the synchronous control unit of the master-slave synchronous system. In FIG. 7, a movement command made in the control unit 100 is supplied to the tool shaft amplifier 220 through the second communication path 210 and then supplied to the tool shaft motor 230. Then, a position feedback value of the tool shaft motor 230 is supplied from the tool shaft amplifier 220 to the workpiece shaft amplifier 120 through the third communication path 310. In the workpiece shaft amplifier 120, the position feedback value is multiplied by a synchronization ratio and then supplied to the workpiece shaft motor 130. In this way, in the master-slave synchronous system, the movement command is supplied from the NC control unit only to the tool shaft (master shaft). A movement command, which is proportional to the position feedback value of the tool shaft, is supplied to the workpiece shaft (slave shaft). In this connection, in the case where the workpiece shaft is a master shaft and the tool shaft is a slave shaft, the foregoing substantially applies.

In a machine tool to which a relatively strong cutting disturbance of low frequency is given, the master-slave synchronous system is adopted in many cases. The reason is for this is that in the case where the frequency of disturbance is low, even when a position feedback value on the master shaft side is changed by disturbance, the slave side is moved so that it can follow the master shaft. Therefore, it is easy to maintain synchronization.

On the other hand, in the case where the frequency of cutting disturbance is high, the NC command synchronous system is adopted. The reason for this is that even when the master-slave synchronous system is adopted and a position feedback value of the master shaft is supplied to the slave shaft, the slave shaft cannot follow the master shaft. Therefore, the slave shaft is only swung by the vibrational movement command.

Accordingly, the synchronization accuracy is lowered, if anything.

In the servo-press disclosed in the official gazette of Japanese Patent No. 3853908, the NC command synchronous system is adopted at the time of high speed operation and the master-slave synchronous system is adopted at the time of low speed operation.

However, when trouble occurs in the control unit or when something abnormal occurs in the communication path between the control unit and two amplifiers, it is impossible to supply a movement command to two shafts. Therefore, it is impossible to maintain synchronization.

The present invention has been accomplished in consideration of the above circumstances. It is an object of the present invention to provide a synchronous control unit capable of synchronizing two shafts with each other even when trouble occurs in the control unit or when something abnormal occurs in the communication path between the control unit and two amplifiers.

SUMMARY OF THE INVENTION

In order to accomplish the object described before, the first aspect provides a synchronous control unit, comprising: a first motor and a first amplifier for driving the first motor; a second motor and a second amplifier for driving the second motor; a NC unit connected to the first and the second amplifier; a first communication path connecting the first amplifier to the NC unit; a second communication path connecting the second amplifier to the NC unit; a third communication path connecting the first amplifier to the second amplifier; a movement command making section arranged in the NC unit, making a movement command of at least one of the first and the second motor; a first communication monitoring section for monitoring communication in the first communication path; a second communication monitoring section for monitoring communication in the second communication path; a deceleration command making section included in the first amplifier, making a deceleration command of the first motor; and a switching section for switching the system from a first synchronous system to a second synchronous system in the case where the first communication monitoring section detects communication trouble in the first communication path or where the second communication monitoring section detects communication trouble in the second communication path, wherein in the first synchronous system, movement commands of the first and the second motor, which are synchronized with each other, made by the movement command making section are respectively supplied to the first and the second amplifier through the first and the second communication path, in the second synchronous system, the first motor is decelerated by the deceleration command made by a deceleration command making section and the second motor is decelerated synchronously with the first motor by a movement command made according to a position feedback value controlled by the first motor supplied to the second amplifier through the third communication path.

The second aspect provides the synchronous control unit according to the first aspect, wherein in the case where the first communication monitoring section detects communication trouble in the first communication path, the first communication monitoring section transmits the trouble in the first communication path to the second amplifier, and in the case where the second communication monitoring section detects communication trouble in the second communication path, the second communication monitoring section transmits the trouble in the second communication path to the first amplifier, so that both the first and the second motor can be simultaneously decelerated.

The third aspect provides the synchronous control unit according to the first or the second aspect, wherein in the second synchronous system, after a position feedback value controlled by the first motor is supplied to the second amplifier, the position feedback value controlled by the first motor is multiplied by a predetermined synchronization ratio, so that a movement command of the second motor is made.

The fourth aspect provides the synchronous control unit according to the first or the second aspect, wherein in the second synchronous system, after a position feedback value controlled by the first motor is multiplied by a predetermined synchronization ratio, the multiplied value is supplied to the second amplifier, so that a movement command of the second motor is made.

From the typical embodiment of the present invention shown in the accompanying drawings, the objects, characteristics, advantages and other objects, characteristics and advantages of the present invention will become more apparent.

DETAILED DESCRIPTION

Referring to the accompanying drawings, embodiments of the present invention will be explained below. In the following drawings, like reference marks are used to indicate like parts. In order to enhance understanding, the reduced scale is appropriately changed in the drawings.

Figure 1:
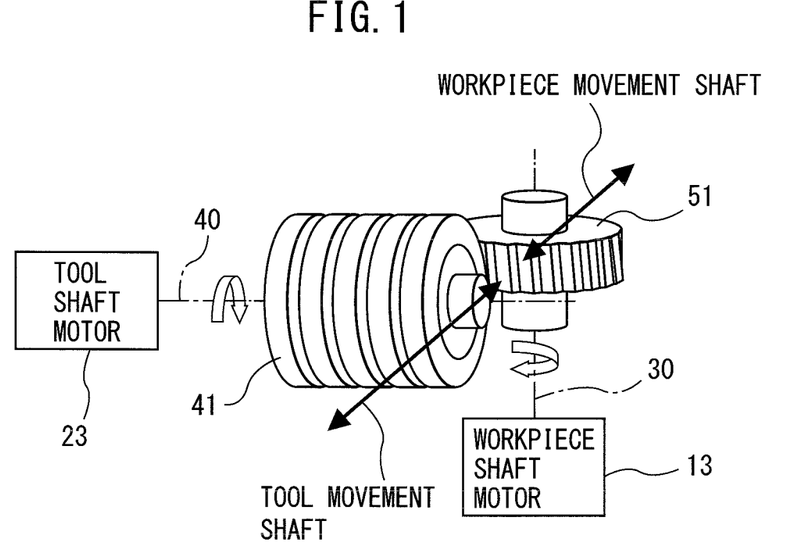
FIG. 1 is a conceptual view of a gear finishing machine driven by the synchronous control unit of the present invention.

FIG. 1 is a conceptual view of a gear finishing machine driven by the synchronous control unit of the present invention. The gear finishing machine mainly includes: a tool shaft motor 23 for rotating a tool 41, for example, a grinding stone or a cutter; and a workpiece shaft motor 13 for rotating a workpiece 51, for example, a gear or a helical gear to be finished. In this connection, in this specification, a rotary shaft of the tool 41 is referred to as a tool shaft 40 and a rotary shaft of the workpiece 51 is referred to as a workpiece shaft 30. In FIG. 1, the tool shaft 40 and the workpiece shaft 30 make a predetermined angle, for example, 90 degrees.

Figure 2:
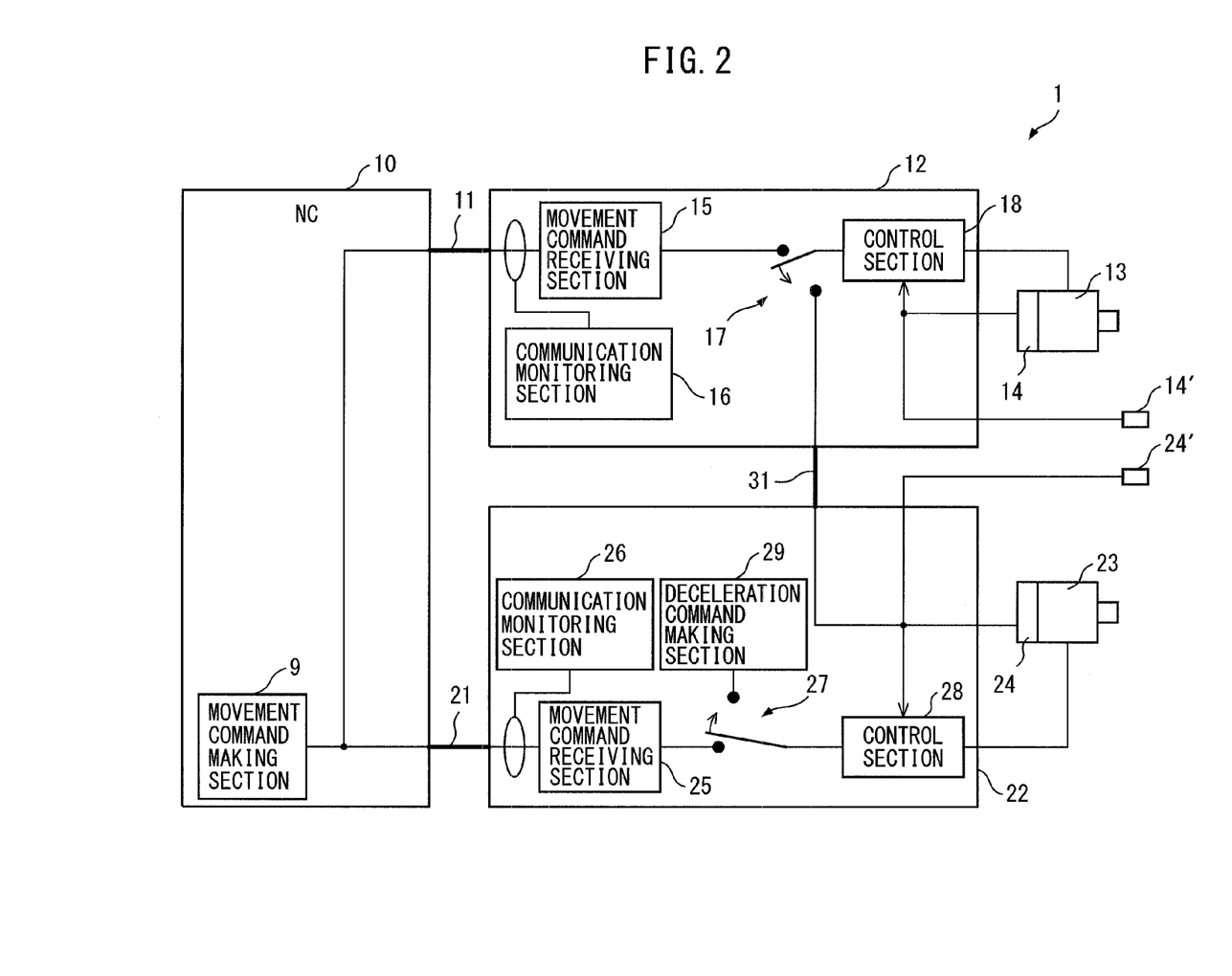
FIG. 2 is a block diagram of the synchronous control unit of one embodiment of the present invention.

FIG. 2 is a block diagram of the synchronous control unit of one embodiment of the present invention. In FIG. 2, the workpiece shaft motor 13 drives the workpiece shaft 30 and the tool shaft motor 23 drives the tool shaft 40. As shown in FIG. 2, the workpiece shaft motor 13 is controlled by the workpiece shaft amplifier 12. The tool shaft motor 23 is controlled by the tool shaft amplifier 22. The workpiece shaft amplifier 12 and the tool shaft amplifier 22 are respectively connected to the NC unit 10 by the first communication path 11 and the second communication path 21. The NC unit 10 controls all shafts.

Figure 4:
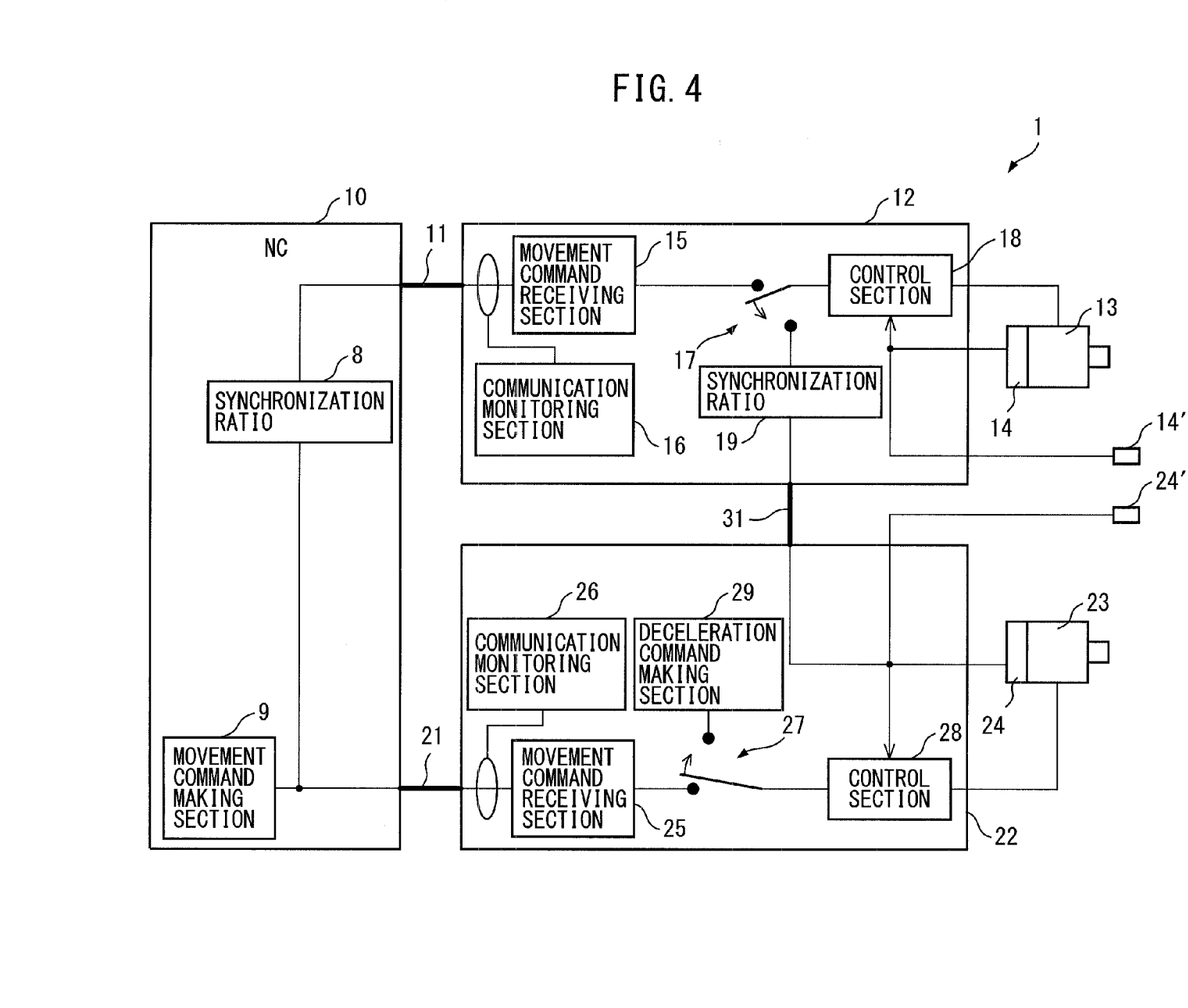
FIG. 4 is a block diagram of the synchronous control unit of another embodiment of the present invention.
Figure 5:
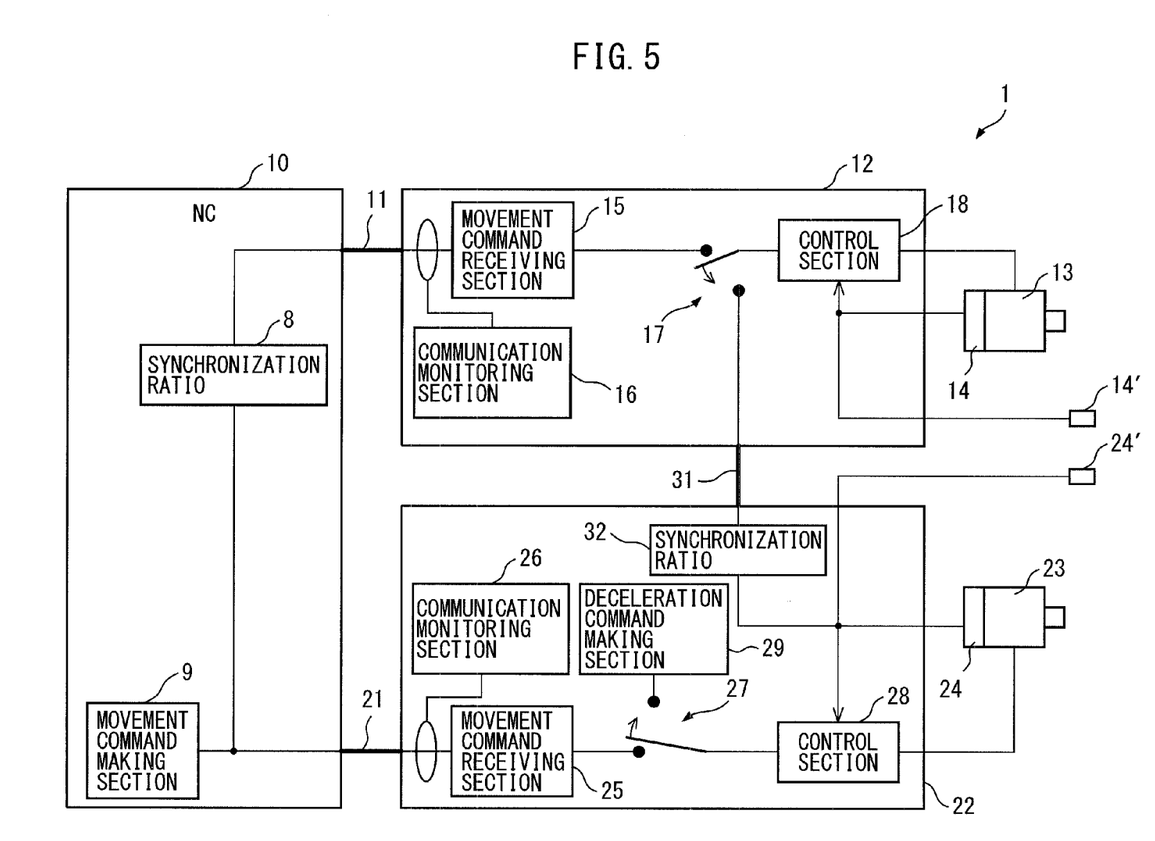
FIG. 5 is a block diagram of the synchronous control unit of still another embodiment of the present invention.

In this case, the NC unit 10 of the synchronous control unit 1 includes a movement command making section 9 for making a movement command that synchronizes the workpiece shaft 30 and the tool shaft 40 with each other. In FIG. 2, when consideration is previously given to the synchronization ratio in the movement command making section 9, different movement commands are made with respect to the workpiece shaft 30 and the tool shaft 40. However, as shown in FIGS. 4 and 5 described later, the movement command for the workpiece shaft 30 may be made when the movement command for tool shaft 40 is multiplied by the synchronization ratio 8.

Further, the position detecting sensor 14, which is arranged in the workpiece shaft motor 13, or the position detecting sensor 14', which is arranged in the workpiece shaft 30 itself, detects a position of the workpiece shaft 30 and feeds back it to the control unit 18 of the workpiece shaft amplifier 12. In the same manner, the position detecting sensor 24, which is arranged in the tool shaft motor 23, or the position detecting sensor 24', which is arranged in the tool shaft itself, detects a position of the tool shaft 40 and feeds it back to the control unit 28 of the tool shaft amplifier 22. Explanations will be made below of a case in which the position detecting sensors 14, 24 are used. However, it should be noted that the state of affairs is the same in the case where the position detecting sensors 14', 24' are used.

As shown in FIG. 2, in the present invention, the third communication path 31 directly connects the workpiece shaft amplifier 12 with the tool shaft amplifier 22. The third communication path 31 is a communication bus and capable of communicating between two amplifiers 12, 22 at high speed.

The workpiece shaft amplifier 12 includes a movement command receiving section 15 for receiving a movement command of the workpiece shaft motor 13 from the movement command making section 9 through the first communication path 11. Further, the workpiece shaft amplifier 12 includes a first communication monitoring section 16 for monitoring the communication of a movement command in the first communication path 11. The workpiece shaft amplifier 12 includes a switching section 17 for switching so that the third communication path 31 can be used when the first communication monitoring section 16 detects trouble in communication in the first communication path 11. The switching section 17 is usually set so that the movement command receiving section 15 and the control section 18 can be connected to each other.

In the same manner, the tool shaft amplifier 22 includes a movement command receiving section 25 for receiving a movement command of the tool shaft motor 23 from the movement command making section 9 through the second communication path 21. Further, the tool shaft amplifier 22 includes a second communication monitoring section 26 for monitoring the communication of a movement command in the second communication path 21. The tool shaft amplifier 22 includes a switching section 27 for switching so that the third communication path 31 can be used when the second communication monitoring section 26 detects trouble in communication in the second communication path 21. The switching section 27 is usually set so that the movement command receiving section 25 and the control section 28 can be connected to each other. Further, the tool shaft amplifier 22 includes a deceleration command making section 29 for making a deceleration command of the tool shaft motor 23 in the case where trouble occurs in the synchronous control unit 1 and the tool shaft motor 23 has to be stopped.

When the synchronous control unit 1 is normally operated, the movement command making section 9 of the NC unit 10 makes respective movement commands for the workpiece shaft motor 13 and the tool shaft motor 23. These movement commands are previously set so that the workpiece shaft motor 13 and the tool shaft motor 23 can be synchronized with each other.

The movement command of the workpiece shaft motor 13 is sent from the movement command making section 9 through the first communication path 11 and received by the movement command receiving section 15 of the workpiece shaft amplifier 12. Further, the movement command of the tool shaft motor 23 is sent from the movement command making section 9 through the second communication path 21 and received by the movement command receiving section 25 of the tool shaft amplifier 22.

Then, these movement commands are respectively supplied to the control sections 18, 28. To the control sections 18, 28, actual positions of the workpiece shaft and the tool shaft detected by the position detecting sensors 14, 24 are inputted. Accordingly, the control sections 18, 28 execute a predetermined position feedback processing and respectively drive the workpiece shaft motor 13 and the tool shaft motor 23. Due to the foregoing, the workpiece shaft 30 and the tool shaft 40 are operated synchronously with each other.

Figure 3A:
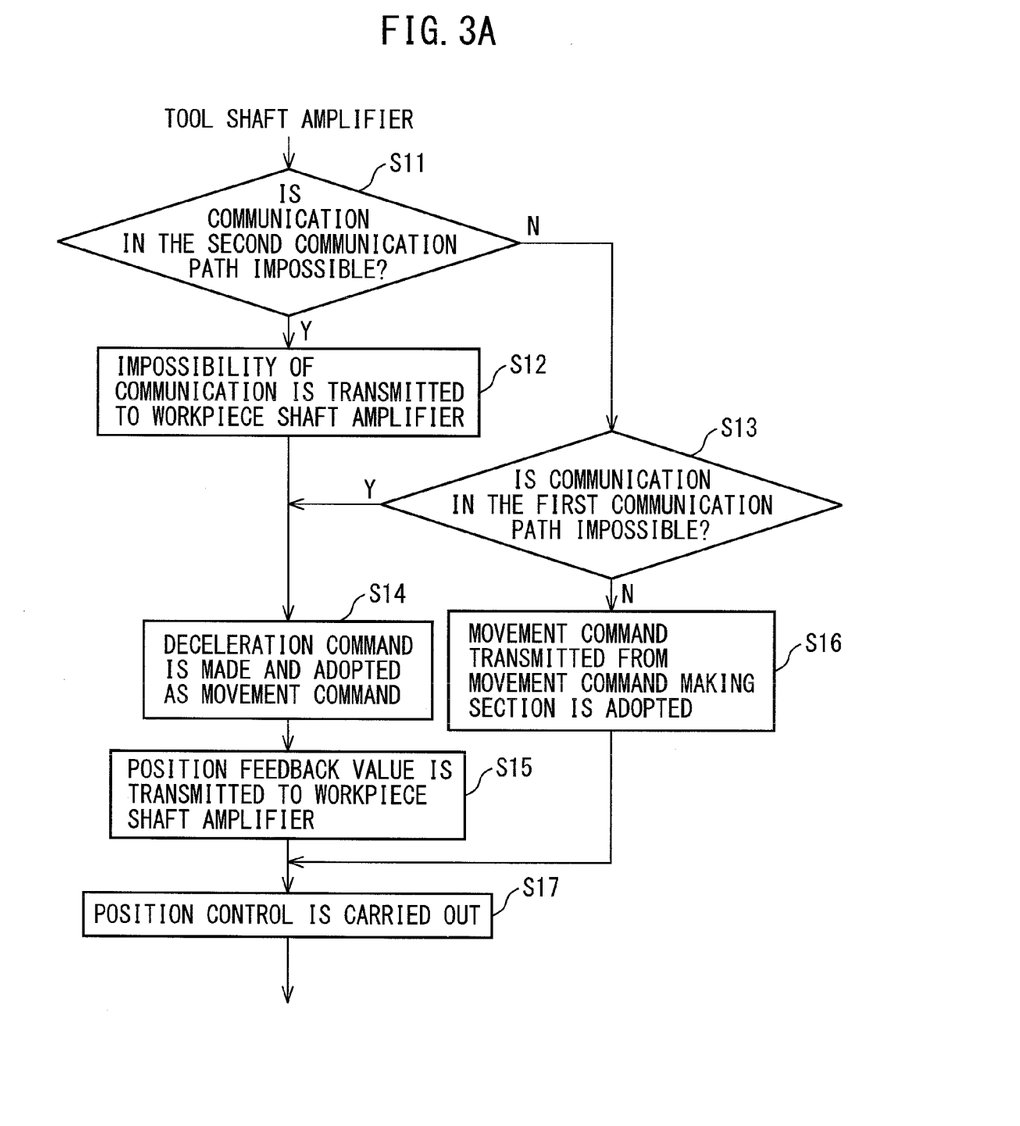
FIG. 3A is a flowchart showing operation of a tool shaft amplifier of the synchronous control unit shown in FIG. 2.
Figure 3B:
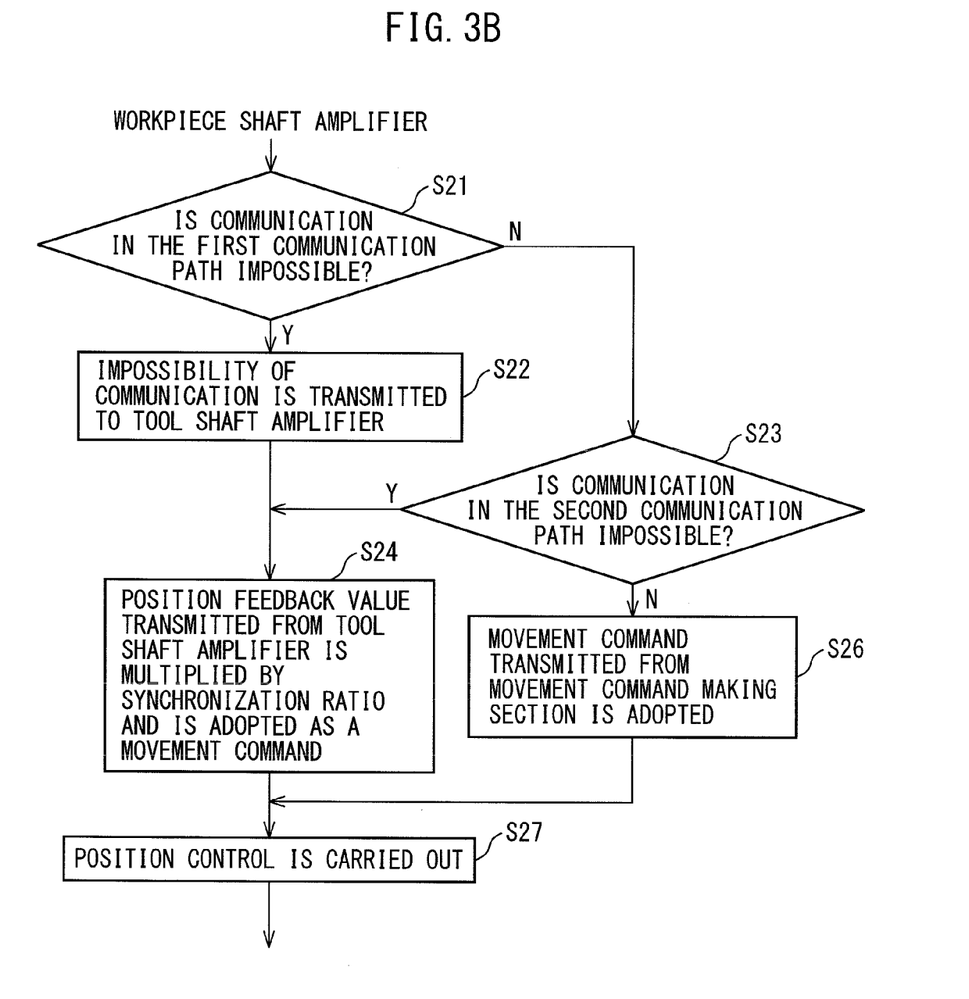
FIG. 3B is a flowchart showing operation of a workpiece shaft amplifier of the synchronous control unit shown in FIG. 2.

FIGS. 3A and 3B are flowcharts respectively showing operation of the tool shaft amplifier and the workpiece shaft amplifier of the synchronous control unit shown in FIG. 2. Contents of FIGS. 3A and 3B are simultaneously carried out at each predetermined control period.

In step S11 shown in FIG. 3A, the second communication monitoring section 26 judges whether or not communication in the second communication path 21 can be executed. In the case where communication in the second communication path 21 cannot be executed, in step S12, the second communication monitoring section 26 transmits that communication in the second communication path 21 cannot be executed to the workpiece shaft amplifier 12 through the third communication path 31.

In the case where the communication in the second communication path 21 can be executed, the process advances to step S13. In step S13, the first communication monitoring section 16 judges whether or not communication can be executed in the first communication path 11. In the case where the communication in the first communication path 11 cannot be executed, the process advances to step S14. On the other hand, in the case where communication in the first communication path 11 can be executed, the process advances to step S16 and a movement command made by the movement command making section 9 is successively used as it is.

Referring to FIG. 3B, in step S21, the first communication monitoring section 16 judges whether or not communication in the first communication path 11 can be executed. In the case where communication in the first communication path 11 cannot be executed, in step S22, the first communication monitoring section 16 transmits that communication in the first communication path 11 cannot be executed to the tool shaft amplifier 22 through the third communication path 31.

In the case where communication can be executed in the first communication path 11, the process advances to step S23. In step S23, the second communication monitoring section 26 judges whether or not communication in the second communication path 21 can be executed. In the case where communication in the second communication path 21 cannot be executed, the process advances to step S24. On the other hand, in the case where communication can be executed in the second communication path 21, the process advances to step S26 and a movement command made by the movement command making section 9 is successively used as it is.

In the case where communication in at least one of the first communication path 11 and the second communication path 21 cannot be executed, the process advances to steps S14 and S24. In the above case, at least one of the first communication path 11 and the second communication path 21 is cut off or the movement command making section 9 of the NC unit 10 does not make a movement command. When trouble occurs in the synchronous control unit 1 as described above, in step S14, the switching section 27 switches the path so that the deceleration command making section 29 and the control section 28 can be connected to each other. In the same manner, in step S24, the switching section 17 switches the path so that the third communication path 31 and the control section 18 can be connected to each other.

In step S14, the deceleration command making section 29 makes a deceleration command of the tool shaft motor 23 and the thus made deceleration command is applied to the tool shaft motor 23. The deceleration command is made for stopping the tool shaft motor 23. Accordingly, the deceleration command, in which a speed command value is gradually reduced according to a predetermined function, is made.

Then, in step S15, a position of the tool shaft detected by the position detecting sensor 24 is supplied from the tool shaft amplifier 22 to the control section 18 of the workpiece shaft amplifier 12 through the third communication path 31.

In step S24, a position feedback value, which is supplied from the tool shaft amplifier 22 through the third communication path 31, is multiplied by a predetermined synchronization ratio (a ratio of the rotation of the tool shaft 40 to the workpiece shaft 30). The thus obtained value is adopted as a movement command of the workpiece shaft motor 13, and the control section 18 controls the workpiece shaft motor 13.

After that, in steps S17 and S27, the position control is carried out. In the case where the switching section 17, 27 is switched as described before, the tool shaft motor 23 is decelerated by the deceleration command and stopped. Then, the control section 18 makes a movement command of the workpiece shaft motor 13 according to the position feedback value of the tool shaft 40 supplied through the third communication path 31. The workpiece shaft 30 follows the decelerating motion of the tool shaft 40 and decelerates while maintaining synchronization. Therefore, in the present invention, the workpiece shaft 30 and the tool shaft 40 can be safely stopped while these shafts are synchronized with each other.

In the present invention, trouble occurring in one of the first communication path 11 and the second communication path 21 is quickly transmitted to the controllers 12, 22 of other communication paths through the third communication path 31. Accordingly, in the present invention, the switching sections 17, 27 simultaneously execute the switching operation so that the workpiece shaft motor 13 and the tool shaft motor 23 can be synchronously decelerated.

FIG. 4 is a block diagram of the synchronous control unit according to another embodiment of the present invention. In FIG. 4, the synchronization ratio 19 is shown in the workpiece shaft amplifier 12. In the embodiment shown in FIG. 4, the switching section 27 executes the switching operation when trouble occurs in the synchronous control unit 1 so that the deceleration command making section 29 and the control section 28 can be connected to each other, and at the same time the switching section 17 executes the switching operation so that the third communication path 31 and the control section 18 can be connected to each other.

In such a case, a position feedback value of the tool shaft 40 is transmitted from the tool shaft amplifier 22 to the workpiece shaft amplifier 12 through the third communication path 31. In the workpiece shaft amplifier 12, the position feedback value of the tool shaft motor 23 is multiplied by the synchronization ratio 19 and supplied to the control section 18. In other words, in the embodiment shown in FIG. 4, the position feedback value of the tool shaft 40 is transmitted from the tool shaft amplifier 22 to the workpiece shaft amplifier 12 without being multiplied by the synchronization ratio 19. After that, the position feedback value is multiplied by the synchronization ratio 19 in the workpiece shaft amplifier 12.

FIG. 5 is a block diagram of the synchronous control unit according to still another embodiment of the present invention. In FIG. 5, the synchronization ratio 32 is shown in the tool shaft amplifier 22. In the embodiment shown in FIG. 5, the switching section 27 executes the switching operation when trouble occurs in the synchronous control unit 1, so that the deceleration command making section 29 and the control section 28 can be connected to each other, and at the same time the switching section 17 executes the switching operation so that the third communication path 31 and the control section 18 can be connected to each other.

In such a case, a position feedback value of the tool shaft 40 is multiplied by the synchronization ratio 32. The thus obtained multiplied value is supplied from the tool shaft amplifier 22 to the control section 18 of the workpiece shaft amplifier 12 through the third communication path 31. In other words, in the embodiment shown in FIG. 5, after the feedback value is multiplied by the synchronization ratio 32, the position feedback value of the tool shaft 40 is transmitted from the tool shaft amplifier 22 to the workpiece shaft amplifier 12. It should be noted that the advantages described before can be obtained in any case. In this connection, even in the case in which the workpiece shaft is a master shaft and the tool shaft is a slave shaft, it will be obvious that the present invention can be applied in the same manner.

Effects of the Invention

In the first aspect, in the case where trouble occurs in the control unit or in the communication path between the control unit and the motor, the first motor (for example, the tool shaft motor) is decelerated by the deceleration command. The second motor (for example, the workpiece shaft motor) is driven by the movement command made according to the position feedback value of the first motor supplied through the third communication path. Accordingly, the second motor follows the decelerating motion of the first motor and decelerates while the synchronization is maintained. Therefore, while the first motor and the second motor are synchronized with each other, these motors can be stopped.

In the second aspect, trouble occurring in one of the first communication path and the second communication path is transmitted to the other amplifier and the switching operation is executed by the switching section. Accordingly, the first motor and the second motor can be simultaneously decelerated while synchronized with each other.

The present invention is explained above using a typical embodiment. However, the changes described above, other various changes, omissions and additions may be made by one skilled in the art without departing from the scope of the present invention.

The invention claimed is:

1. A synchronous control unit, comprising:
   a first motor and a first amplifier for driving the first motor;
   a second motor and a second amplifier for driving the second motor;
   a NC unit connected to the first and the second amplifier;
   a first communication path connecting the first amplifier to the NC unit;
   a second communication path connecting the second amplifier to the NC unit;
   a third communication path connecting the first amplifier to the second amplifier;
   a movement command making section arranged in the NC unit, making a movement command of at least one of the first and the second motor;
   a first communication monitoring section for monitoring communication in the first communication path;
   a second communication monitoring section for monitoring communication in the second communication path;
   a deceleration command making section included in the first amplifier, making a deceleration command of the first motor; and
   a switching section for switching the system from a first synchronous system to a second synchronous system in the case where the first communication monitoring section detects communication trouble in the first communication path or in the case where the second communication monitoring section detects communication trouble in the second communication path, wherein
   in the first synchronous system, movement commands of the first and the second motor, which are synchronized with each other, made by the movement command making section are respectively supplied to the first and the second amplifier through the first and the second communication path,
   in the second synchronous system, the first motor is decelerated by a deceleration command made by the deceleration command making section and the second motor is decelerated synchronously with the first motor by a movement command made according to a position feedback value controlled by the first motor supplied to the second amplifier through the third communication path.

2. The synchronous control unit according to claim 1, wherein in the case where the first communication monitoring section detects communication trouble in the first communication path, the first communication monitoring section transmits the trouble in the first communication path to the second amplifier, and in the case where the second communication monitoring section detects communication trouble in the second communication path, the second communication monitoring section transmits the trouble in the second communication path to the first amplifier, so that both the first and the second motor can be simultaneously decelerated.

3. The synchronous control unit according to claim 1, wherein in the second synchronous system, after a position feedback value controlled by the first motor is supplied to the second amplifier, the position feedback value controlled by the first motor is multiplied by a predetermined synchronization ratio, so that a movement command of the second motor is made.

4. The synchronous control unit according to claim 2, wherein in the second synchronous system, after a position feedback value controlled by the first motor is supplied to the second amplifier, the position feedback value controlled by the first motor is multiplied by a predetermined synchronization ratio, so that a movement command of the second motor is made.

5. The synchronous control unit according to claim 1, wherein in the second synchronous system, after a position feedback value controlled by the first motor is multiplied by a predetermined synchronization ratio, the multiplied value is supplied to the second amplifier, so that a movement command of the second motor is made.

6. The synchronous control unit according to claim 2, wherein in the second synchronous system, after a position feedback value controlled by the first motor is multiplied by a predetermined synchronization ratio, the multiplied value is supplied to the second amplifier, so that a movement command of the second motor is made.

* * * * *